United States Patent Office 3,406,019
Patented Oct. 15, 1968

3,406,019
SALTS OF $B_{11}H_{11}^{2-}$ AND THEIR PREPARATION
Earl L. Muetterties, West Chester, Pa., assignor to E. I. du Pont de Nemours and Company, Wilmington, Del., a corporation of Delaware
No Drawing. Filed Feb. 28, 1966, Ser. No. 530,375
13 Claims. (Cl. 23—361)

ABSTRACT OF THE DISCLOSURE

The invention is directed to preparation of salts of undecahydroundecaborates represented by the formula:

$$M_a(B_{11}H_{11})_b \cdot mH_2O$$

---

This invention relates to novel polyhedral boron compounds and their preparation. More specifically are invention is directed to salts of undecahydroundecaborates. These salts can be represented by the formula $$M_a(B_{11}H_{11})_b \cdot mH_2O$$

wherein M is a cation having a total atomic weight of at least 5 and a valence of 1–3, i.e. 1, 2 or 3, and is further defined below; $(B_{11}H_{11})$ is a polyhedral borate anion of valence 2−, $m$ is an integer of 0 through 10, and $a$ and $b$ are the smallest positive integers of 1 through 3 which satisfy the equation $$b = \frac{a \times \text{valence of } M}{2}$$

In the above formula M is a group which can be composed of one or more than one element and which is ionically bonded to the polyhedral boron anion. The groups represented by M bear a positive ionic charge and they have in common the property of forming positively charged groups or cations in water. The principal function of the group M is to provide an element or group of elements which bear the necessary positive charges to combine with the novel anion, and thus permit its isolation as part of a stable compound.

The properties of the group M are not critical and the group therefore represents a broad range of elements or combinations of elements. M can be certain metals, ammonium ($NH_4^+$), hydrocarbyl-substituted ammonium, hydrocarbyl-substituted sulfonium, hydrocarbyl-substituted phosphonium, hydrocarbyl-substituted arsonium, or metal-ammine. Because of ease of obtainability the valence of M is preferably 1 or 2.

Metals that can serve as cations in the compounds of the above general formula include the elements of Group I–A having atomic numbers of 3–55, inclusive; Group II–A having atomic numbers of 12–56, inclusive; I–B having atomic numbers of 29–47, inclusive; II–B having atomic number of 30–80; inclusive; the first series of transition elements having atomic numbers of 23–28, inclusive; and thallium. These groups are those shown in the Periodic Table in Lange's "Handbook of Chemistry," 9th edition, pages 56–57, Handbook Publishers, Inc. (1956). Specific metals operable as cations in the salts of this invention are lithium, sodium, potassium, rubidium, cesium, magnesium, calcium, strontium, barium, copper, silver, zinc, cadmium, mercury, vanadium, chromium, manganese, iron, cobalt, nickel and thallium. Preferred metals are the alkali and alkaline earth metals, and most preferred are the alkali metals especially cesium and sodium.

The hydrocarbyl-substituted ammonium, sulfonium, phosphonium or arsonium cations can be represented by the formulas $RNH_3^+$, $R_2NH_2^+$, $R_3NH^+$, $R_4N^+$, $RPH_3^+$, $R_2PH_2^+$, $R_3PH^+$, $R_4P^+$, $RAsH_3^+$, $R_2AsH_2^+$, $R_4As^+$ and $R_3S^+$. In these formulas R represents hydrocarbyl. The hydrocarbyl substituents are not critical features of these cations and thus can be open-chain, closed-chain, saturated, unsaturated or a heterocyclic ring of which the N, S, P or As atoms are the hetero component. Thus R can be alkyl, cycloalkyl, alkenyl, alkynyl, aryl, alkaryl, aralkyl, alkylene and the like. For reasons of availability R preferably contains not more than 18 carbon atoms. For example, R can be methyl, 2-ethylhexyl, octadecyl, allyl, cyclohexyl, cyclohexenyl, phenyl, naphthyl, anthryl, cyclohexylphenyl, diphenylyl, benzyl, and the like. Preferably R is alkyl or aryl of up to 10 carbon atoms. Thus, the atomic weights of the hydrocarbyl-substituted cations can range from a low value of about 32 for $CH_3NH_3$ to a value as high as about 800 or even higher for long-chain substituted cations, e.g., the cation from trioctadecylamine.

The cation can also be a metal ammine such as those of the formula $(NH_3)_nY$ where $n$ is a positive whole number of at most 6 and Y is cobalt, nickel, zinc, cadmium, mercury or silver, as, for example $Zn(NH_3)_4^{+2}$, $Ni(NH_3)_6^{+2}$, $Co(NH_2C_2H_4NH_2)_3^{+2}$, and the like.

The cation can also be a combination of cations, as for example, two monovalent metals or a monovalent metal and a hydrocarbyl-substituted ammonium group. These are exemplified by $NaKB_{11}H_{11}$, $Cs(CH_3)_4NB_{11}H_{11}$, $Na(CH_3)_3SB_{11}H_{11}$ and the like.

Many of the metal salts of the $B_{11}H_{11}^{2-}$ anions are isolated from aqueous systems in the form of hydrated salts, i.e., the salts crystallize with water of hydration. Thus the hydrated salts have the general formula $$M_a(B_{11}H_{11})_b \cdot mH_2O$$

where $m$ is a positive number greater than 0 but not more than 10. In some cases, the water of hydration of these salts can be removed by heating the hydrated salt to elevated temperatures under reduced pressures, e.g., by heating at 150–200° C. under a pressure of less than 0.1 mm. of Hg for several hours.

Examples of novel compounds of the invention included by the general formula are as follows:

$Li_2B_{11}H_{11} \cdot 6–10H_2O$
$Na_2B_{11}H_{11} \cdot 6–10H_2O$
$Cs_2B_{11}H_{11}$
$Rb_2B_{11}H_{11}$
$MgB_{11}H_{11} \cdot 6H_2O$
$SrB_{11}H_{11} \cdot 2H_2O$
$BaB_{11}H_{11}$
$Cu_2B_{11}H_{11} \cdot 4H_2O$
$Ag_2B_{11}H_{11}$
$ZnB_{11}H_{11} \cdot 6H_2O$
$Tl_2B_{11}H_{11}$
$FeB_{11}H_{11} \cdot 6H_2O$
$NiB_{11}H_{11} \cdot 6H_2O$
$CoB_{11}H_{11} \cdot 6H_2O$
$MnB_{11}H_{11} \cdot 6H_2O$
$(NH_4)_2B_{11}H_{11}$
$[(C_2H_5)_4N]_2B_{11}H_{11}$
$[(C_8H_{17}NH_3]_2B_{11}H_{11}$
$[(C_{18}H_{37})_2NH_2]_2B_{11}H_{11}$
$[(C_4H_9)_3NH]_2B_{11}H_{11}$
$(\text{pyridinium})_2B_{11}H_{11}$
$(\text{quinolinium})_2B_{11}H_{11}$
$[C_6H_{11})_2NH_2]_2B_{11}H_{11}$
$[(C_6H_5CH_2)_2NH_2]_2B_{11}H_{11}$
$[(C_3H_5)_3NH]_2B_{11}H_{11}$
$Zn(NH_3)_4B_{11}H_{11}$
$[(C_6H_5)_4P]_2B_{11}H_{11}$
$[C_4H_9)_2PH_2]_2B_{11}H_{11}$
$[(C_8H_{17})_3PH]_2B_{11}H_{11}$
$[(C_{18}H_{37})PH_3]_2B_{11}H_{11}$
$[(C_4H_9)_3S]_2B_{11}H_{11}$ The cesium and rubidium undecahydroundecaborates, i.e., compounds of the formula $M'_2B_{11}H_{11}$, where M' is Cs or Rb, are prepared by pyrolyzing the corresponding cesium or rubidium tridecahydroundecaborate, $M'_2B_{11}H_{13}$, in accordance with the equation $$M'_2B_{11}H_{13} \xrightarrow{\Delta} M'_2B_{11}H_{11} + H_2$$

The pyrolysis is carried out at temperatures ranging from 100° C. to 400° C., and preferably at 225–275° C.; at pressures ranging from $10^{-4}$ mm. of Hg up to several atmospheres, e.g., 10 atmospheres, and preferably at 10–600 mm. of Hg. The heating is normally continued until the evolution of hydrogen ceases, but this is not necessary. The reaction is heterogenous, i.e., it does not require the presence of any solvent. However, an organic solvent boiling above 200° C., e.g., triethylene glycol dimethyl ether or bis[2-(2-methoxyethoxy)ethyl]ether, can be used if desired. The resulting $M'_2B_{11}H_{11}$ salt is obtained as a solid which need not be purified because the hydrogen released indicates a quantitative conversion of the reactant.

The cesium and rubidium tridecahydroundecaborate starting materials for this process can be prepared by the method described by Aftandilian, Miller, Parshall, and Muetterties, Inorg. Chem. 1, 734 (1962). This article describes the synthesis of salts of $B_{11}H_{14}^-$ by treating $MBH_4$ with $B_{10}H_{14}$ in the presence of an ether at 90° C., and conversion of the $B_{11}H_{14}^-$ salts to $B_{11}H_{13}^{2-}$ salts in strongly basic solutions.

The other salts of this invention can be prepared from the cesium and rubidium salts by methods involving metathetical reactions with other salts or hydroxides to effect an exchange of cations. For example, the sodium salt, $Na_2B_{11}H_{11}$, can be prepared by passing the cesium salt, through a sodium ion-exchange resin. $Na_2B_{11}H_{11}$ can be treated with a halide salt of the hydrocarbyl-substituted ammonium, phosphonium, sulfonium or arsonium cations to obtain the corresponding onium $B_{11}H_{11}^{2-}$ salt which forms as a precipitate in the aqueous reaction medium.

The metal ammine $B_{11}H_{11}^{2-}$ salts can be prepared by treating the sodium salt with the halide, Y halide, in $NH_4OH$ whereupon the metal ammine, $Y(NH_3)_n$, salt of $B_{11}H_{11}^{2-}$ precipitates.

The metal cation salts of $B_{11}H_{11}^{2-}$ can be obtained by metathetical reaction with other metal salts. For example, a water-soluble salt of $B_{11}H_{11}^{2-}$, such as $Na_2B_{11}H_{11}$, is reacted with another water-soluble salt, such as TlF, chosen such that the cation of the second water-soluble salt will precipitate with the $B_{11}H_{11}^{2-}$ anion, e.g., $Tl_2B_{11}H_{11}$. Similarly, $AgNO_3$ will precipitate $Ag_2B_{11}H_{11}$. By selecting the proper combination of metal salts, the $M_a(B_{11}H_{11})_b$ salts of this invention can be prepared and isolated.

The products and processes of the invention are illustrated in further detail by the following examples.

Examples 1 and 2 illustrate the preparation of novel salts of the invention from $M'_2B_{11}H_{13}$.

Example 1

A 150-ml. flask was charged with 5.6 g. of $Cs_2B_{11}H_{13}$, attached to a conventional vacuum train, evacuated to a pressure of 3–5 microns of mercury, and gradually heated to 270° C. Hydrogen evolution commenced at about 100° C., proceeded briskly around 230° C. and leveled off at higher temperatures with the pressure increasing to 1–600 mm. of Hg during the heating. Over a period of two hours at 240–270° C., 364 ml. of hydrogen was generated. The solid reaction product, $Cs_2B_{11}H_{11}$, was dissolved in water and the solution was treated with an excess of aqueous tetramethylammonium hydroxide. The resulting precipitate was collected by filtration and purified by recrystallization from 75 ml. of hot water with slow cooling of the solution. This gave two crops of cesium tetramethylammonium undecahydroundecaborate amounting to a total of 3.8 g.

*Analysis.*—Calcd. for $(CH_3)_4NCsB_{11}H_{11}$: Cs, 39.4%; C, 14.3%; H, 6.9%; N, 4.2%; B, 35.3%. Found: Cs, 39.3%; C, 14.8%; H, 6.8%; N, 4.2%; B, 35.6%.

Platinum-catalyzed acid hydrolysis of

$(CH_3)_4NCsB_{11}H_{11}$ afforded 1527.7 ml. of hydrogen per gram of compound. This is the amount required for the equation:

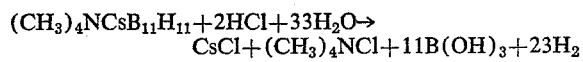

$(CH_3)_4NCsB_{11}H_{11}+2HCl+33H_2O \rightarrow$
$CsCl+(CH_3)_4NCl+11B(OH)_3+23H_2$ Calc.: 1528 ml./g.

The infrared spectrum of $(CH_3)_4NCsB_{11}H_{11}$, after subtraction of the contribution of the tetramethylammonium ion, shows a strong B–H absorption at 2450 cm.$^{-1}$, a band of medium intensity at 1060 cm.$^{-1}$ with a shoulder at 1020 cm.$^{-1}$, and a weak band at 723 cm.$^{-1}$.

The $B^{11}$ n-m-r spectrum, measured at 19.25 mc., shows two doublets in the intensity ratio 10:1. The doublet of relative intensity 10 occurs at +35.2 p.p.m. from trimethyl borate, and the doublet of intensity 1 occurs at +47.1 p.p.m. The respective B–H coupling constants are: $J_{B-H}=122\pm6$ c.p.s. for the low-field doublet, and $J_{B-H}=125\pm15$ c.p.s. for the high-field doublet.

Crystals of $(CH_3)_4NCsB_{11}H_{11}$ were found to be monoclinic, with $a=12.59$ A., $b=5.69$ A., $C=5.68$ A., $\beta=96.62°$. Calculated density by X-ray: $\rho=1.385$; experimental density: 1.368.

In acetonitrile sloution with $(C_4H_9)_4NClO_4$ as supporting electrolyte, a well-defined polarographic oxidation wave was observed at $E_{1/2}=+0.20$ volt (reference potential: saturated calomel electrode) corresponding to approximately a 2 electron oxidation.

A sample of $Cs_2B_{11}H_{11}$ obtained as the solid reaction product as described above gave an n-m-r spectrum showing two doublets of relative intensity 10:1 indicating it was relatively pure.

Example 2

$Cs_2B_{11}H_{13}$ (0.9 g.) was slowly heated in a vacuum system. There was no evidence of gas evolution until a temperature of about 240° C. was achieved. At this point, hydrogen was evolved during about 15 minutes (the temperature varied between 240–260° C.) and approximately one mole of hydrogen per mole of $Cs_2B_{11}H_{13}$ was obtained. The system was cooled to room temperature and the solid residual material was dissolved in water. Addition of trimethylsulfonium iodide gave a salt which was recrystallized from water. The following elemental analyses were obtained:

*Analysis.*—Calcd. for $[(CH_3)_3S]_2B_{11}H_{11}$: B, 41.8%; H, 10.3%; C, 25.3%; S, 22.6%. Found: B, 40.5%; H, 9.8%; C, 22.7%; S, 21.1%.

Example 3 illustrates the use of an ion-exchange resin to obtain additional salts of $B_{11}H_{11}^{2-}$.

Example 3

An aqueous solution of 0.4 g. of $(CH_3)_4NCsB_{11}H_{11}$ was passed through a column packed with a sodium ion-exchange resin which was prepared by saturating the acid cation-exchange resin known commercially as "Rexyn" 101(H) with a saturated solution of sodium chloride in water, washing with water until the run-off was neutral and free of chloride ion, and the effluent was evaporated to dryness. The residue was hydrated sodium undecahydroundecaborate, $Na_2B_{11}H_{11} \cdot mH_2O$.

Examples 4–7 illustrate processes for obtaining the onium salts of this invention.

Example 4

The sodium undecahydroundecaborate hydrate of Example 3 was dissolved in 30 ml. of water and an excess of a saturated aqueous solution of trimethylsulfonium iodide was added. The resulting precipitate was collected by filtration and recrystallized from 20 ml. of water to give 0.1 g. of small, white crystals of bis(trimethylsulfonium) undecahydroundecaborate.

*Analysis.*—Calcd. for $[(CH_3)_3S]_2B_{11}H_{11}$: B, 41.8%; S, 22.6%. Found: B, 42.2%; S, 22.9%.

Example 5

An aqueous solution of 1.7 g. of hydrated $Na_2B_{11}H_{11}$ (prepared as described in Example 3) was treated with a solution of 4 g. of triphenylmethylphosphonium chloride in 50 ml. of water. The resulting crude precipitate was collected and recrystallized from a mixture of 100 ml. of acetonitrile and 25 ml. of ethanol to give, in two crops, a total of 2.8 g. of yellow crystals of bis(triphenylmethylphosphonium) undecahydroundecaborate.

*Analysis.*—Calcd. for $[(C_6H_5)_3CH_3P]_2B_{11}H_{11}$: C, 66.7%; H, 6.9%; B, 17.4%; P, 9.1%. Found: C, 66.1%; H, 7.1; B, 17.7%; P, 8.3%.

Example 6

To a solution of $Na_2B_{11}H_{11}$, prepared from $(CH_3)_4NCsB_{11}H_{11}$ in the manner described in Example 3, containing approximately 0.4 g. of $Na_2B_{11}H_{11}$ in 12.5 ml. of water there was added an aqueous solution of triethyl ammonium chloride. The resulting white precipitate was recrystallized from 20 ml. of acetonitrile to give small, white crystals (0.5 g.). The infrared absorption of these crystals showed only the readily identifiable composite features of the ions $(C_2H_5)_3NH^+$ and $B_{11}H_{11}^{2-}$, indicating that the product was $[(C_2H_5)_3NH]_2B_{11}H_{11}$.

Example 7

To a solution of 1.6 g. of hydrated $Na_2B_{11}H_{11}$ (prepared as described in Example 3) in 5 ml. of water there was added a solution of 3 g. of tetraphenylarsonium chloride in 100 ml. water. The resulting precipitate was collected and recrystallized from a mixture of 120 ml. of ethanol and 30 ml. of acetonitrile to give, in two crops, 0.8 g. of yellowish crystals of bis(tetraphenylarsonium) undecahydroundecaborate.

*Analysis.*—Calcd. for $[(C_6H_5)_4As]_2B_{11}H_{11}$: C, 64.3%; H, 5.7%; B, 13.3%. Found: C, 64.5%; H, 6.4%; B, 12.5%.

Examples 8–11 illustrate the preparation of salts of the invention where M is metal-ammine.

Example 8

A solution of 3 g. of solid hydrated $Na_2B_{11}H_{11}$, prepared as described in Example 3, in 5 ml. of water was mixed with 7 g. of $Zn(NH_3)_2Cl_2$ in an excess of ammonium hydroxide. A crude precipitate, amounting to 3.8 g., was collected by filtration of the reaction mixture. This precipitate was twice recrystallized from 100 ml. of dilute ammonium hydroxide solution to give 2.4 g. of relatively large, column-like, colorless crystals of $Zn(NH_3)_4B_{11}H_{11}$.

*Analysis.*—Calcd. for $Zn(NH_3)_4B_{11}H_{11}$: Zn, 24.8%; B, 45.2%; N, 21.3%; H, 8.8%. Found: Zn, 24.6%; B, 44.4%; N, 21.1%; H, 8.8%.

Platinum-catalyzed acidic hydrolysis gave 1952 ml. of $H_2$ per gram of compound which is consistent with the equation $$Zn(NH_3)_4B_{11}H_{11} + 6HCl + 33H_2O \rightarrow ZnCl_2 + 4NH_4Cl + 11B(OH)_3 + 23H_2$$

Theory requires 1954 ml. $H_2$/g.

Example 9

A solution of approximately 0.3 g. of hydrated $Na_2B_{11}H_{11}$ (prepared as described in Example 3) in a small amount of water was made. To this, a solution of 2 g. of cadmium chloride in aqueous ammonium hydroxide was added. A precipitate (1.3 g.) was obtained which was collected by filtration and recrystallized from 300 ml. of ammonium hydroxide to give 0.7 g. of small, white needles which were identified as $Cd(NH_3)_{5.5}(H_2O)_{0.5}B_{11}H_{11}$

*Analysis.*—Calcd. for $Cd(NH_3)_{5.5}(H_2O)_{0.5}B_{11}H_{11}$: Cd, 32.6%; B, 34.5%; N, 22.3%; H, 8.3%. Found: Cd, 32.1%; B, 34.3%; N, 22.3%; H, 8.4%.

Example 10

Approximately 0.3 g. of hydrated $Na_2B_{11}H_{11}$ (prepared as described in Example 3) was dissolved in a small amount of water. To this solution, a solution of 1 g. of cobalt (II) chloride in aqueous ammonium hydroxide was added. A violet precipitate was obtained which was identified by infrared analysis as $Co(NH_3)_6B_{11}H_{11}$.

Example 11

Approximately 0.3 g. of hydrated $Na_2B_{11}H_{11}$ (prepared as described in Example 3) was dissolved in a small amount of water. This solution was treated in a fashion similar to that of Examples 9 and 10 with a solution of 2 g. of nickel (II) chloride in aqueous ammonium hydroxide to give a gray-green precipitate of $Ni(NH_3)_6B_{11}H_{11}$, identified by infrared analysis.

Example 12 illustrates cationic exchange processes to obtain salts of the invention wherein M is a metal.

Example 12

To a solution of $Na_2B_{11}H_{11}$, prepared from $(CH_3)_4NCsB_{11}H_{11}$ in the manner described in Example 3, containing approximately 0.4 g. of $Na_2B_{11}H_{11}$ in 12.5 ml. of water there was added a saturated aqueous solution of thallium fluoride, and a yellow precipitate formed. This was collected by filtration, washed with methanol and ether, and dried. There was obtained 0.5 g. of product. The infrared absorption spectrum of the product was identical with that of $Cs_2B_{11}H_{11}$, thus showing that it was $Tl_2B_{11}H_{11}$.

By using the procedure of the example appearing below the reactants listed below can be used to obtain the products listed.

| Example | Reactants | Products |
|---|---|---|
| 6 | $CsB_{11}H_{11}$ $(CH_3)_4NOH$ | $(CH_3)_4NCsB_{11}H_{11}$ |
| 5 | $Na_2B_{11}H_{11}$ $(C_2H_5)PH_3Br$ | $[(C_2H_5)PH_3]_2B_{11}H_{11}$ |
| 5 | $Na_2B_{11}H_{11}$ $(C_4H_9)(C_2H_5)_2PHCl$ | $[(C_4H_9)(C_2H_5)_2PH]_2B_{11}H_{11}$ |
| 4 | $Na_2B_{11}H_{11}$ $(C_6H_5)(CH_3)_2SBr$ | $[(C_6H_5)(CH_3)_2S]_2B_{11}H_{11}$ |
| 3 | $Cs_2B_{11}H_{11}$ $NH_4^+$ ion exchange resin | $(NH_4)_2B_{11}H_{11}$ |
| 6 | $Na_2B_{11}H_{11}$ $(C_6H_5)_2NH_2Cl$ | $[(C_6H_5)_2NH_2]_2B_{11}H_{11}$ |
| 6 | $Na_2B_{11}H_{11}$ $CH_3NH_3Br$ | $[CH_3NH_3]_2B_{11}H_{11}$ |
| 7 | $Na_2B_{11}H_{11}$ $(C_2H_5)_2AsH_2Cl$ | $[(C_2H_5)_2AsH_2]_2B_{11}H_{11}$ |
| 9 | $Na_2B_{11}H_{11}$ $HgCl_2 + NH_4OH$ | $[Hg(NH_3)_2]B_{11}H_{11}$ |
| 3 | $Na_2B_{11}H_{11}$ $Mg^{2+}$ ion exchange resin | $MgB_{11}H_{11} \cdot 6H_2O$ |
| 3 | $Na_2B_{11}H_{11}$ $Ba^{2+}$ ion exchange resin | $BaB_{11}H_{11}$ |
| 12 | $Na_2B_{11}H_{11}$ $CuCl_2$ | $Cu_2B_{11}H_{11}$ |
| 3 | $Cs_2B_{11}H_{11}$ $Mn^{2+}$ ion exchange resin | $MnB_{11}H_{11} \cdot 6H_2O$ |
| 3 | $Cs_2B_{11}H_{11}$ $Ni^{2+}$ ion exchange resin | $NiB_{11}H_{11} \cdot 6H_2O$ |

The products of this invention are solids that are salt-like in character. Many of the compounds dissolve in water and in organic solvents, e.g., methanol, acetonitrile and dimethyl sulfoxide. The $B_{11}H_{11}^{2-}$ anion in aqueous solution is stable toward weak acids, such as acetic acid, but it is degraded by very strong acids, such as 1:1 sulfuric acid, with evolution of hydrogen.

The compounds of this invention are useful as reducing agents, and are especially useful as reducing agents in the preparation of printed electrical circuits. For example, on a clean paper surface a circuit is traced using an aqueous solution of sodium undecahydroundecaborate. After evaporation of the solvent, the tracings are sprayed with a solution of palladium chloride in acetonitrile. A black metallic tracing of palladium appears along the circuit lines.

The compounds can also be used to prepare electrical resistors. By way of illustration, a cotton string is impregnated with a nearly saturated solution of sodium undecahydroundecaborate in a volatile solvent, e.g., water, acetonitrile, or dimethyl sulfoxide. The string is removed from the solution and allowed to dry. When the string is burned in an open flame, a coherent ash is obtained which in shape and size resembles the original string. The skeletons have electrical resistivities of the order of $10^5$–$10^6$ ohms./mm. They are useful electrical resistors.

The foregoing detailed description has been given for clearness of understanding only and no unnecessary limitations are to be understood therefrom. The invention is not limited to the exact details shown and described, for obvious modifications will occur to those skilled in the art.

The embodiments of this invention in which an exclusive property or privilege is claimed are defined as follows:

1. Boron compounds represented by the formula $$M_a(B_{11}H_{11})_b \cdot mH_2O$$

wherein M is a cation, having a total atomic weight of at least 5 and a valence 1 through 3, selected from the group consisting of
(1) metals of Groups I–A having atomic numbers of 3 through 55, II–A having atomic numbers of 12 through 56, I–B having atomic numbers of 29 through 47, II–B having atomic numbers of 30 through 80, the first series of transition elements having atomic numbers of 23 through 28, and thallium,
(2) hydrocarbyl-substituted ammonium, sulfonium, phosphonium or arsonium cations wherein each hydrocarbyl group contains not more than 18 carbon atoms,
(3) metal-ammines of the formula $(NH_3)_nY$ wherein Y is cobalt, nickel, zinc, cadmium, mercury or silver and n is a positive whole number of at most 6;
(4) ammonium, and
(5) combinations of the above; m is an integer of 0 through 10; $(B_{11}H_{11})$ is a polyhedral borate anion of valence 2−; and a and b are the smallest positive whole numbers of 1 through 3 which satisfy the equation $$b = \frac{a \times \text{valence of } M}{2}$$

2. Compounds of claim 1 wherein M is the class of cations defined in part (1) of claim 1.
3. Compounds of claim 1 wherein M is the class of cations defined in part (2) of claim 1.
4. Compounds of claim 1 wherein M is the class of cations defined in part (3) of claim 1.
5. Compounds of claim 1 wherein M is an alkali or alkaline earth metal.
6. Compounds of claim 1 wherein M is an alkali metal.
7. The compound of claim 1 having the formula $$(CH_3)_4NCs(B_{11}H_{11})$$

8. The compound of claim 1 having the formula $$[(CH_3)_3S]_2(B_{11}H_{11})$$

9. The compound of claim 1 having the formula $$Na_2(B_{11}H_{11}) \cdot m\ H_2O$$

10. The compound of claim 1 having the formula $$Cs_2(B_{11}H_{11})$$

11. The compound of claim 1 having the formula $$Zn(NH_3)_4(B_{11}H_{11})$$

12. Process for preparing compounds of the formula $$M'_2B_{11}H_{11}$$

wherein M' is cesium or rubidium which comprises pyrolyzing a compound of the formula $$M'_2B_{11}H_{13}$$

wherein M' is defined as above, at a temperature of 100° to 400° C. and a pressure of from $10^{-4}$ mm. of mercury to 10 atmospheres.

13. Process of claim 12 wherein the temperature is between 225° and 275° C. and the pressure is between 10 and 600 mm. of mercury.

References Cited

Berry, T. E. et al.: "Tetrahedron Letters" Pergamon Press, London; 1965, pp. 715–720.

Hawthorne, M. F. et al.: "Journal of the American Chemical Society," vol. 87, September 1965; pp. 3987–88.

OSCAR R. VERTIZ, *Primary Examiner.*

G. O. PETERS, *Assistant Examiner.*